US010393029B2

(12) United States Patent
Tramontin (10) Patent No.: US 10,393,029 B2
(45) Date of Patent: Aug. 27, 2019

(54) SETTING CONTROL FOR GAS TURBINE ENGINE COMPONENT(S)

(71) Applicant: ROLLS-ROYCE plc, London (GB)

(72) Inventor: Timothy Tramontin, Derby (GB)

(73) Assignee: ROLLS-ROYCE plc, London (GB)

(*) Notice: Subject to any disclaimer, the term of this patent is extended or adjusted under 35 U.S.C. 154(b) by 293 days.

(21) Appl. No.: 15/402,885

(22) Filed: Jan. 10, 2017

(65) Prior Publication Data

US 2017/0211485 A1 Jul. 27, 2017

(30) Foreign Application Priority Data

Jan. 26, 2016 (GB) .................................. 1601427.6

(51) Int. Cl.
*F02C 9/22* (2006.01)
*F02C 9/20* (2006.01)
*F01D 9/04* (2006.01)

(52) U.S. Cl.
CPC .............. *F02C 9/22* (2013.01); *F01D 9/041* (2013.01); *F02C 9/20* (2013.01); *F05D 2200/30* (2013.01);
(Continued)

(58) Field of Classification Search
CPC .... F02C 9/22; F02C 9/20; F01D 9/041; F05D 2270/021; F05D 2200/30; F05D 2260/821;
(Continued)

(56) References Cited

U.S. PATENT DOCUMENTS 3,614,253 A * 10/1971 Gaertner ................. F04D 27/02
415/147
4,338,061 A * 7/1982 Beitler .................... F01D 11/24
415/1

(Continued)

FOREIGN PATENT DOCUMENTS

EP 1 013 891 A1 6/2000
RU 2399787 C1 9/2010

OTHER PUBLICATIONS

May 24, 2017 Search Report issued in European Patent Application No. 17150820.
(Continued)

*Primary Examiner* — Joseph J Dallo
(74) *Attorney, Agent, or Firm* — Oliff PLC (57) ABSTRACT

A method of controlling settings of one or more actuatable gas turbine engine components includes: providing a first matrix which relates reduction in the operational parameter maximum value during the transient manoeuvre to settings of the component(s); providing a second matrix which relates the operational parameter maximum values attained during the transient manoeuvre: time to attain the maximum value after transient manoeuvre initiation, and operational parameter rate of change at the time of the maximum value; monitoring the engine in operation to identify a start of a transient manoeuvre; predicting, on the basis of the second matrix maximum values, an overshoot operational parameter amount during the identified transient manoeuvre and a time the overshoot occurrence; selecting a setting, using the first matrix, to eliminate the predicted overshoot; and applying the setting to the component(s) for a predetermined period around the predicted time of occurrence to reduce or avoid the overshoot.

13 Claims, 6 Drawing Sheets

(52) U.S. Cl.
CPC .. *F05D 2260/821* (2013.01); *F05D 2270/021* (2013.01); *F05D 2270/112* (2013.01); *F05D 2270/309* (2013.01); *F05D 2270/44* (2013.01)

(58) Field of Classification Search
CPC ........... F05D 2270/44; F05D 2270/112; F05D 2270/309
See application file for complete search history.

(56) References Cited

U.S. PATENT DOCUMENTS

| | | | | |
|---|---|---|---|---|
| 4,625,510 | A | 12/1986 | Evans | |
| 4,849,895 | A * | 7/1989 | Kervistin | F01D 11/24 701/100 |
| 4,884,397 | A | 12/1989 | LaPrad et al. | |
| 4,958,289 | A * | 9/1990 | Sum | B64C 11/305 416/27 |
| 4,995,786 | A * | 2/1991 | Wheeler | F01D 5/141 415/148 |
| 5,012,420 | A * | 4/1991 | Walker | F01D 11/24 415/1 |
| 5,165,844 | A * | 11/1992 | Khalid | F01D 11/20 415/17 |
| 5,165,845 | A * | 11/1992 | Khalid | F01D 11/20 415/17 |
| 6,155,038 | A * | 12/2000 | Irwin | F01D 11/24 415/17 |
| 6,351,721 | B1 * | 2/2002 | Werner | G01B 21/16 324/207.25 |
| 6,560,965 | B1 * | 5/2003 | Fukumoto | F01D 25/002 134/19 |
| 7,465,145 | B2 * | 12/2008 | Kane | F01D 11/20 415/1 |
| 7,827,803 | B1 * | 11/2010 | Wadia | F01D 17/162 415/17 |
| 8,126,628 | B2 * | 2/2012 | Hershey | F01D 11/24 244/75.1 |
| 8,649,954 | B2 | 2/2014 | Boyer et al. | |
| 9,097,133 | B2 * | 8/2015 | Dong | F01D 11/08 |
| 2001/0001845 | A1 | 5/2001 | Khalid et al. | |
| 2008/0243352 | A1 | 10/2008 | Healy | |

OTHER PUBLICATIONS

Jun. 29, 2016 Search Report issued in British Application No. 1601427.6.

* cited by examiner

| time \ TGTdotNorm | 0 | 0.1 | 0.2 | 0.3 | 0.4 |
|---|---|---|---|---|---|
| 0 s | 0 | 0 | 0 | 0 | 0 |
| 2 s | 0.241 | 0.342 | 0.348 | 0.294 | 0.003 |
| 4 s | 0.354 | 0.439 | 0.413 | 0.016 | 0 |
| 6 s | 0.361 | 0.447 | 0.037 | 0 | 0 |
| 8 s | 0.362 | 0.071 | 0 | 0 | 0 |
| 10 s | 0 | 0 | 0 | 0 | 0 |

SETTING CONTROL FOR GAS TURBINE ENGINE COMPONENT(S)

FIELD OF THE INVENTION

The present invention relates to a method and system for controlling settings of one or more components of a gas turbine engine, and particularly, but not exclusively, for controlling angular positions of one or more rows of variable-pitch stator vanes of a gas turbine engine.

BACKGROUND

Gas turbine engines have control systems which determine various operational settings of the engine. For example, scheduling algorithms can be used to adjust the fuel flow and the angular positions of variable-pitch stator vanes (VSVs), and other control inputs to meet safety criteria (avoidance of compressor surge, lean blow-out etc.) and power and efficiency objectives. The control systems typically receive as inputs operating parameters and settings that, in conjunction with such scheduling algorithms, determine turbine control settings to achieve a desired operation. Measured input operating parameters may include compressor inlet pressure and temperature, compressor exit pressure and temperature, turbine exhaust temperature, and engine power output. The schedules relate operational quantities, such as a temperature to a pressure ratio or a temperature to a fuel split, and the output of the schedules thereby determines the appropriate adjustment of control system command inputs to the engine, such as fuel flow, fuel split, and vane angular position.

A problem arises, however, that such schedules are typically designed around a fully deteriorated, worst case engine, but the schedules are used even when the engine is brand new. In addition, such schedules do not take account that no two engines are the same, due to e.g. hardware variations from manufacturing tolerances, and/or hardware modifications during service.

Figure 1:
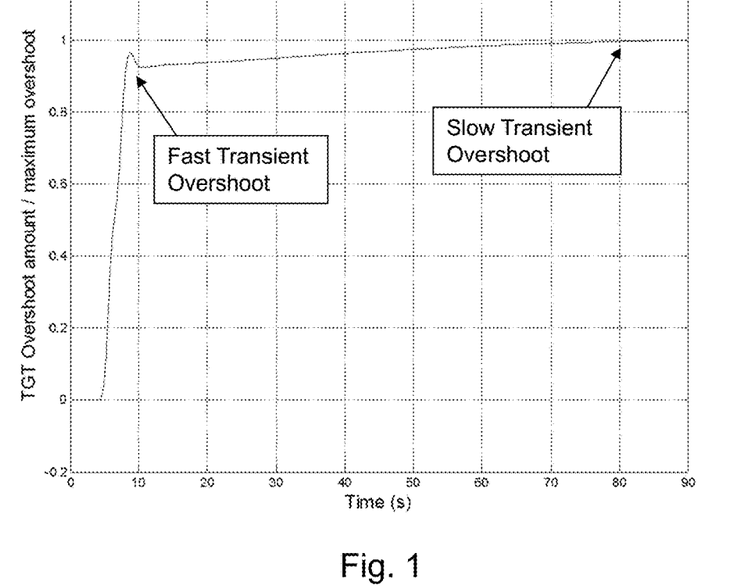
FIG. 1 shows a plot of normalised turbine gas temperature overshoot against time for a slam acceleration from low idle.

A further problem is that while such an approach allows the engine to be operated in a manner consistent with, for example, safety criteria and power and efficiency objectives, there may be other engine considerations which are compromised or overlooked. For example, it is desirable that an engine has a long time-on-wing through a reduced requirement for maintenance shop visits. One cause of such visits is transient overshoot. In particular, during a take-off slam acceleration, shaft speeds and the turbine entry gas temperature may temporarily exceed agreed amounts of margin between respective design limits and maximum achievable values in service. This is illustrated in FIG. 1, which shows a plot of normalised turbine gas temperature overshoot against time for such slam acceleration from low idle. During the initial phase of the transient, the gas temperature briefly reaches 96% and then drops to 92% of the final stabilised value, indicated on the figure as the "fast transient overshoot", generating rapid temperature gradients in the hot end of the turbomachinery with detrimental effects on component life, risk of turbine blading rubbing against the liner excessively, and risk to the integrity of thermal barrier coatings if present. The fast transient overshoot is then followed by a slow transient overshoot which can enhance component degradation and necessitate an early shop visit.

Similar overshoot problems may apply to control of other gas turbine engine components, such as active casing control of blade tip clearances by varying the amount of a compressed air bleed used to cool the casing. In this case, the controlled component can be a compressed air bleed valve.

It would be desirable to effect an engine operation that, while meeting safety criteria and power and efficiency objectives, is also able to reduce or avoid the incidence of engine overshoots during transients.

SUMMARY

Conventionally, compressor VSVs are used to increase the compressor stability margin at off design conditions by controlling the incidence onto the blading and the distribution of work between the stages of the compressor. As the VSVs are rotated, the spool speed changes, such that the work done by the compressor remains approximately constant. Generally, the VSVs are scheduled to progressively open as the engine speed increases. The present invention can involve angular position control of one or more rows of VSVs of a gas turbine engine to reduce or avoid overshoot of an engine operational parameter during a transient engine manoeuvre, or more generally the control of component settings to reduce or avoid such overshoot. By "variable-pitch stator vanes" we include both vanes that are located between rows of rotating compressor blades and vanes (often called "inlet guide vanes") which are located at the inlet to the compressor.

In a first aspect, the present invention provides a method of controlling settings of one or more actuatable components of a gas turbine engine to reduce or avoid overshoot of an engine operational parameter during a transient engine manoeuvre, the method including:

providing a first matrix which relates reduction in the maximum value of the operational parameter during the transient manoeuvre to settings of the component(s);

providing a second matrix which relates maximum values of the operational parameter attained during the transient manoeuvre to: time to attain the maximum value after initiation of the transient manoeuvre, and rate of change of the operational parameter at the time of the maximum value;

monitoring the engine in operation to identify a start of a transient manoeuvre;

predicting, on the basis of the maximum values of the second matrix, an amount of overshoot of the operational parameter during the identified transient manoeuvre and a time of occurrence of the overshoot;

selecting a setting, using the first matrix, to eliminate the predicted overshoot; and applying the selected setting to the component(s) for a predetermined period around the predicted time of occurrence to reduce or avoid the overshoot.

Due to the limited time frame relative to flight timescales of the transient overshoots, the method can avoid significantly impacting on overall engine operational efficiency. However, by avoiding or at least reducing transient overshoots, the method can advantageously increase the lifetime of engine parts and increase the time between maintenance shop visits. The method can also be independent of the detailed actuation system of the component. Although of particular benefit when applied for the suppression of fast transient overshoots, the method can also be used to suppress slow transient overshoots.

Further aspects of the present invention provide: a computer program comprising code which, when run on a computer, causes the computer to perform the method of the first aspect; a computer readable medium storing a computer program comprising code which, when run on a computer, causes the computer to perform the method of the first aspect; a computer system programmed to perform the method of the first aspect. For example, a computer system can be provided for controlling settings of one or more actuatable components of a gas turbine engine to reduce or avoid overshoot of an engine operational parameter during a transient engine manoeuvre, the system including:

a computer-readable medium, storing: a first matrix which relates reduction in the maximum value of the operational parameter during the transient manoeuvre to settings of the component(s); and a second matrix which relates maximum values of the operational parameter attained during the transient manoeuvre to: time to attain the maximum value after initiation of the transient manoeuvre, and rate of change of the operational parameter at the time of the maximum value; and one or more processors operatively connected to the computer-readable medium and configured to: monitor the engine in operation to identify a start of a transient manoeuvre; predict, on the basis of the maximum values of the second matrix, an amount of overshoot of the operational parameter during the identified transient manoeuvre and a time of occurrence of the overshoot; select a setting, using the first matrix, to eliminate the predicted overshoot; and apply the selected setting to the component(s)for a predetermined period around the predicted time of occurrence to reduce or avoid the overshoot. The system thus corresponds to the method of the first aspect.

A further aspect of the present invention provides a gas turbine engine having one or more actuatable components and the computer system of the previous aspect, the settings of the one or more components being controllable by the computer system to reduce or avoid overshoot of an engine operational parameter during a transient engine manoeuvre.

Optional features of the invention will now be set out. These are applicable singly or in any combination with any aspect of the invention.

The operational parameter may be a working gas temperature of the engine (e.g. turbine entry gas temperature) or a shaft speed of the engine (e.g. high pressure shaft speed).

The method may be a method of controlling angular positions of one or more rows of variable-pitch stator vanes of a gas turbine engine to reduce or avoid overshoot of an engine operational parameter during a transient engine manoeuvre, wherein: the component(s) are variable pitch stator vanes, the settings of the component(s) are angular position settings of the variable-pitch stator vanes, the setting selected using the first matrix is a selected angular position setting, and the selected angular position setting is applied to the variable-pitch stator vanes for the predetermined period around the predicted time of occurrence. The rows of variable-pitch stator vanes may include one or more rows of high pressure compressor variable-pitch stator vanes and/or one or more rows of intermediate pressure compressor variable-pitch stator vanes.

Alternatively, the method may be a method of controlling valve position of a blade tip clearance, casing control, compressed air bleed valve of a gas turbine engine to reduce or avoid overshoot of an engine operational parameter during a transient engine manoeuvre, wherein: the component is a compressed air bleed valve, the setting of the component is the position of the bleed valve, the setting selected using the first matrix is a selected valve position, and the selected valve position setting is applied to the bleed valve for the predetermined period around the predicted time of occurrence.

The start of the transient manoeuvre can be identified by an increase in engine speed demand exceeding a predetermined amount in less than a predetermined time.

The amount of the overshoot and the time of occurrence of the overshoot may be predicted by linear extrapolation from the values of the second matrix.

The method may further include determining the first matrix by applying, for each of a series of initial transient manoeuvres of the engine, a respective setting to the component(s) and measuring the corresponding reduction in the maximum value of the operational parameter. The method may then also include determining the second matrix by measuring, for each of the series of initial transient manoeuvres of the engine, the respective maximum value of the operational parameter, the respective time to attain the maximum value after initiation of the transient manoeuvre, and the respective rate of change of the operational parameter at the time of the maximum value. Thus the method is self-learning and does not rely on any engine model-based prediction. Further the self-learning approach is capable of adapting to hardware changes throughout engine life and can extend life (e.g. reduce deterioration) and performance of engines that lie at the extremes of the build scatter band.

The method may further include recalibrating the first matrix by applying, for each of a series of subsequent transient manoeuvres of the engine, a respective predetermined setting to the component(s), measuring the corresponding reduction in the maximum value of the operational parameter, and recalibrating the first matrix on the basis of the measured reductions in the maximum value from the series of subsequent transient manoeuvres. Thus the method enables re-adjustment and re-calibration as needed using the engine itself rather than requiring a complex engine model. The number of subsequent transient manoeuvres may be less (typically substantially less) than the number of settings of the first matrix.

The transient manoeuvre can be a slam acceleration, a take-off go-around, or a slam deceleration.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Specific details are given in the following description to provide a thorough understanding of the embodiments. However, it will be understood by one of ordinary skill in the art that embodiments maybe practiced without these specific details. For example, well-known circuits, processes, algorithms, structures, and techniques may be shown without unnecessary detail in order to avoid obscuring the embodiments.

Also, it is noted that embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

As disclosed herein, the term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 2:
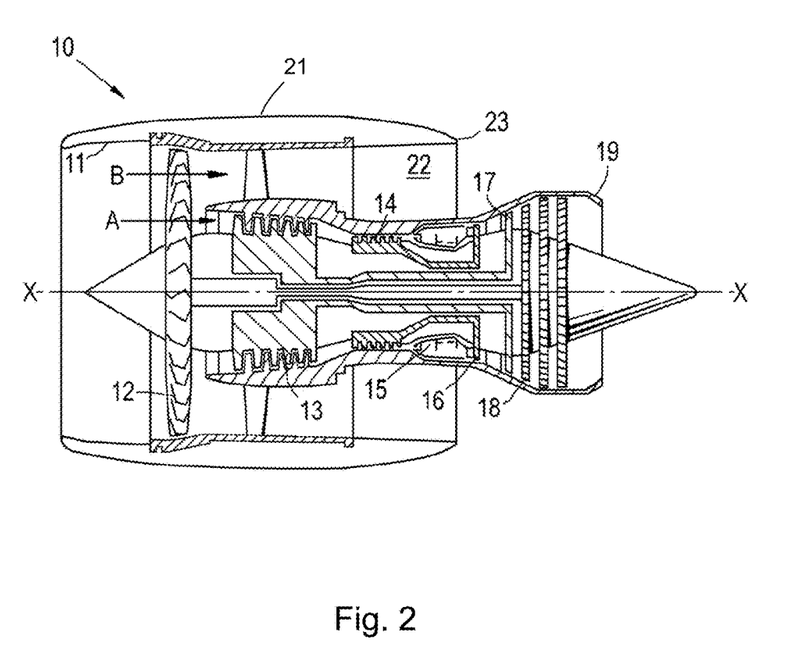
FIG. 2 shows a longitudinal cross-section through a ducted fan gas turbine engine.

With reference to FIG. 2, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The engine 10 is controlled by an engine electronic controller (EEC—not shown) which receives measurements of engine operational parameters such as compressor inlet pressure and temperature, compressor exit pressure and temperature, turbine exhaust temperature, and engine power output. The EEC stores schedules such as exhaust temperature vs. compressor pressure ratio, fuel split vs. combustion reference temperature, compressor operating limit line vs. corrected speed and VSV angular position. The EEC receives desired operational settings, such as a thrust demand, and uses the measured operational parameters and schedules to determine appropriate command inputs (e.g. fuel flow, fuel split, VSV angular position, tip clearance) to the engine to achieve those settings.

The EEC further has a sub-system for reducing or avoiding overshoot of turbine entry gas temperature (TGT) during transient engine manoeuvres such as slam acceleration. It achieves this by fine control of the angular positions of one or more rows of variable-pitch stator vanes of the intermediate-pressure 13 and high-pressure 14 compressors.

Figure 3:
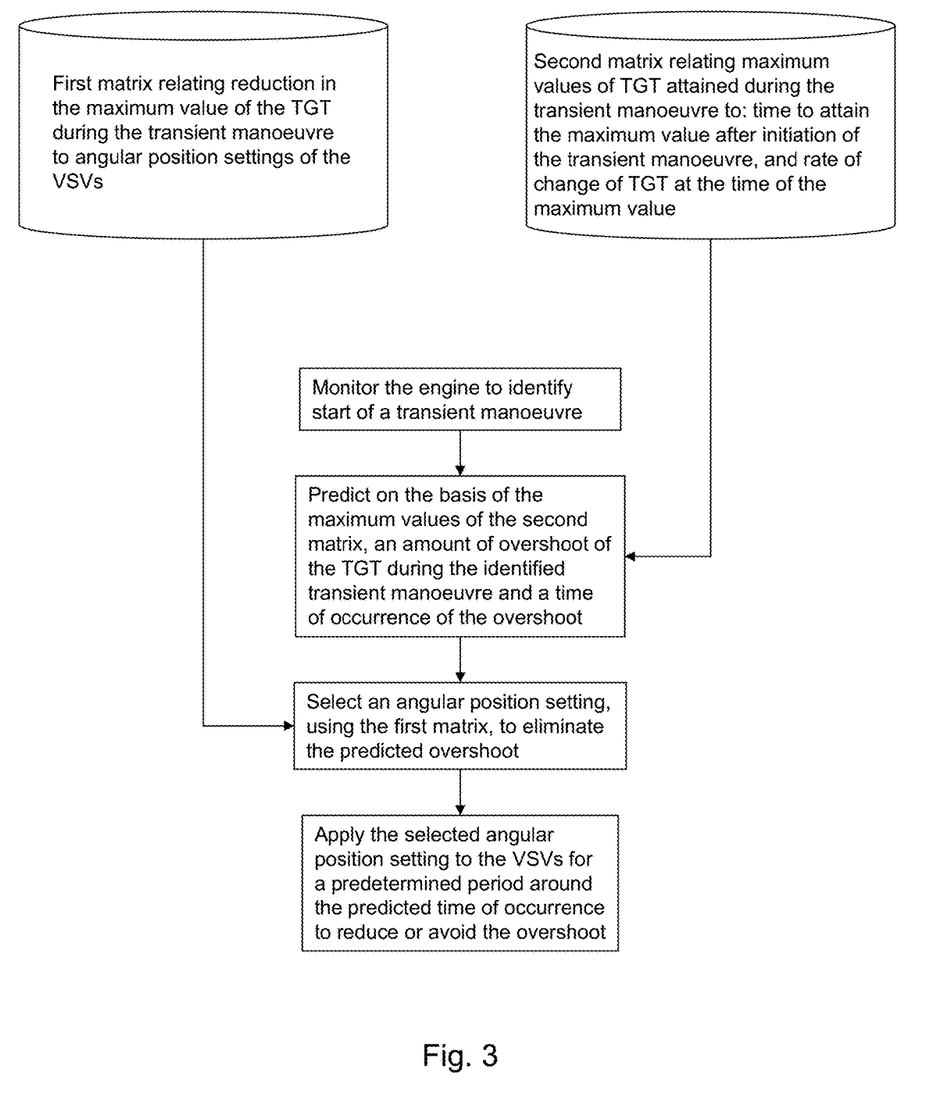
FIG. 3 is a flowchart providing an overview of a method for reducing or avoiding overshoot of turbine entry gas temperature (TGT) during transient engine manoeuvres.
Figure 4:
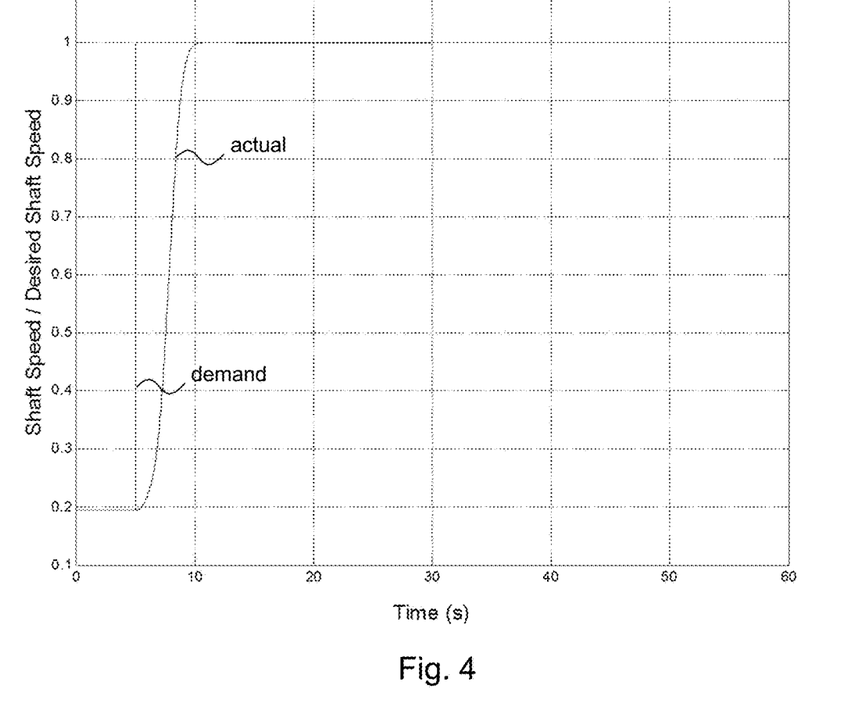
FIG. 4 shows a plot of demanded and actual normalised fan shaft speed during a slam acceleration from idle.

FIG. 3 is a flowchart providing an overview of the method implemented by the sub-system. The first stage of the method is to identify a start of a transient manoeuvre. FIG. 4 shows a plot of demanded and actual normalised fan shaft speed during a slam acceleration from idle. The method detects a slam acceleration when the demand changes by more than a predetermined amount (e.g. 60%) in less than a predetermined time (e.g. 0.5 seconds).

The method then employs a first matrix which relates reduction in the maximum value of TGT during the transient manoeuvre to angular position settings of the VSVs. It also employs a second matrix which relates maximum values of TGT attained during the transient manoeuvre to: time to attain the maximum value after initiation of the transient manoeuvre, and rate of change of TGT at the time of the maximum value. Before describing the use of these matrices, we explain how the matrices are derived.

Figure 5:
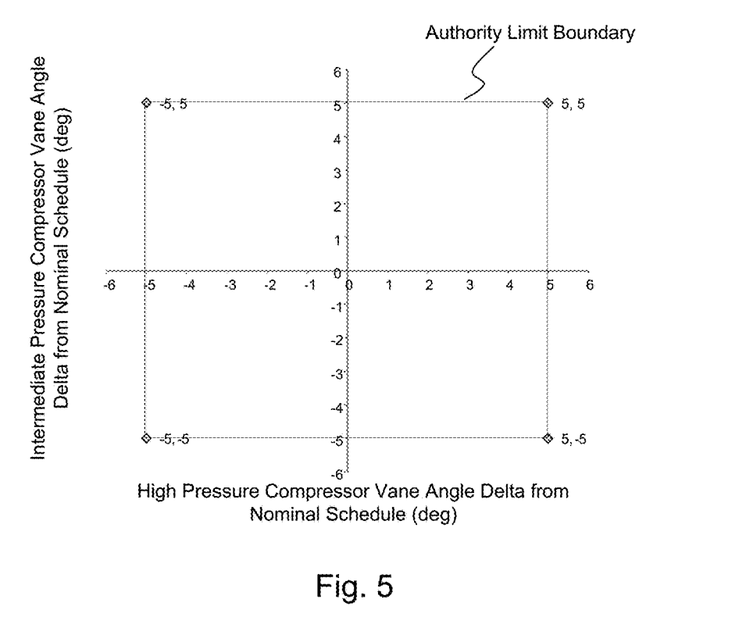
FIG. 5 shows a diagram for selecting illustrative predetermined angular position settings.

During an initial learning phase of the sub-system, each time the engine experiences a slam acceleration from idle, the sub-system applies a predetermined angular position setting to the VSVs for the duration of the transient manoeuvre. The predetermined angular position settings can be systematically selected according to the diagram shown in FIG. 5, which plots along one axis departure (delta) of the intermediate-pressure compressor VSV angle from the nominal scheduled angle in steps of one degree, and along the other axis departure (delta) of the high-pressure compressor VSV angle from the nominal scheduled angle in steps of one degree. Each position of the plot thus provides a respective combination of angle settings. By varying the angle settings in fixed steps of e.g. 1 or 2 degrees, representative settings of combinations within an authority limit boundary (which in the example of FIG. 5 is ±5 degrees from the nominal scheduled angle for both the intermediate and high-pressure compressor VSV angle) can be obtained.

Figure 6:
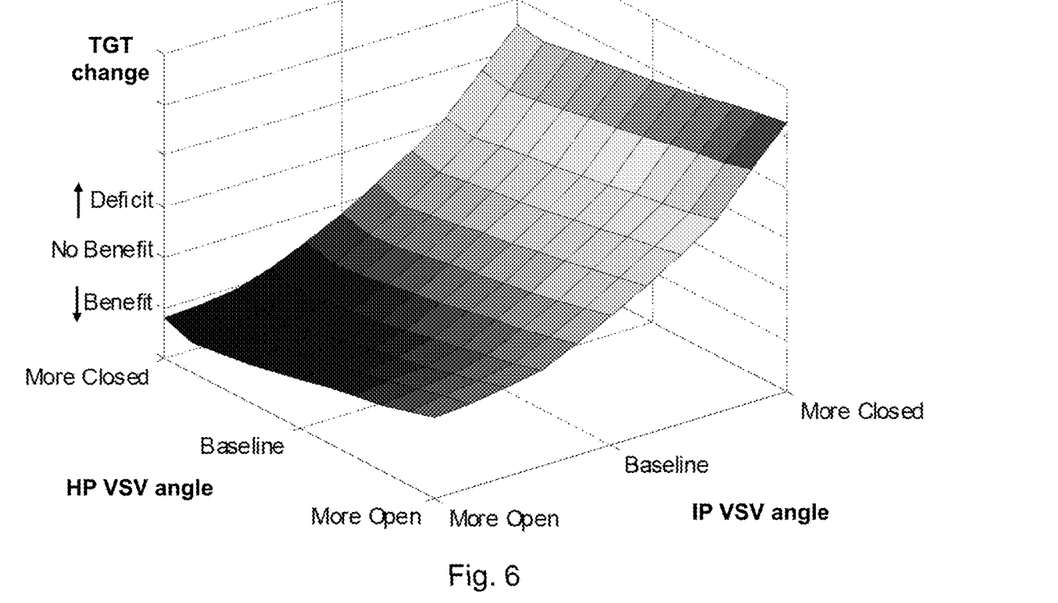
FIG. 6 shows a representative 3D plot of TGT change against the intermediate and high-pressure compressor VSV angle modification.

For each of these predetermined angular position settings, the corresponding reduction in the maximum value of TGT is measured (e.g. via suitably positioned thermocouples) and used to populate the first matrix. FIG. 6 shows a representative 3D plot of TGT change against the intermediate and high-pressure compressor VSV angle modification.

Figure 7:
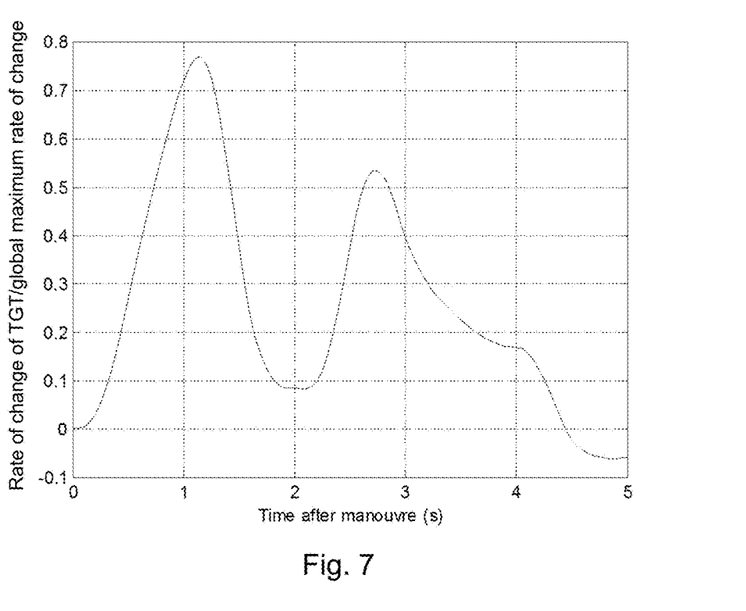
FIG. 7 shows a plot of normalised TGT rate of change against time for the take-off slam acceleration manoeuvre of FIG. 1, where the global maximum rate of change represents the absolute value of the largest rate of change expected in service for an engine type.

At the same time, for each slam acceleration from idle during the learning phase, the sub-system determines the rate of change of TGT. For example, FIG. 7 shows a plot of normalised TGT rate of change against time for the take-off slam acceleration manoeuvre of FIG. 1. The maximum in TGT is achieved at the zero crossing point at about 4.5 sec. From the plot of FIG. 7, the maximum TGT value can be related to the time to attain the maximum value after initiation of the transient manoeuvre, and the rate of change of TGT at the time of the maximum value. These values are used to populate the second matrix.

Figure 8:
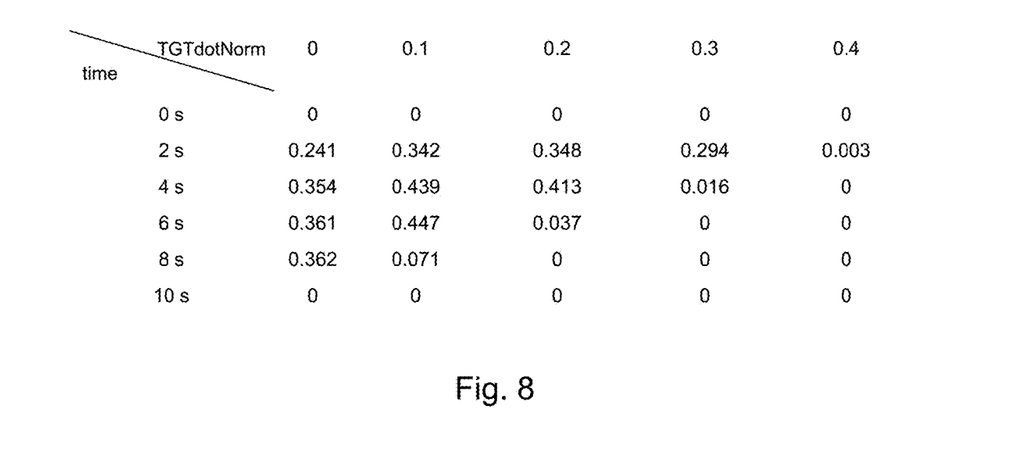
FIG. 8 shows an example of a matrix of normalised maximum TGT values, each row of the matrix being the maximum TGT values for a given time to attain that maximum TGT value after initiation of a transient manoeuvre, and each column of the matrix being the maximum TGT values for a given normalised rate of change of TGT at the time of that maximum TGT value.

FIG. 8 shows an example of such a matrix. For consistency, the maximum TGT values can all be referenced to sea level international standard atmosphere conditions.

Returning then to the flowchart of FIG. 3, having identified a start of a slam acceleration, the sub-system linearly extrapolates from the second matrix to predict the amount of TGT overshoot and the time of occurrence of that overshoot. This is achieved by using the current rate of change and the TGT value at the previous time step to linearly extrapolate rate of change evolution as a function of time, and by interrogating the table to find the maximum TGT value for the predicted future rate of change and the corresponding time. As the manoeuvre progresses, the prediction is continuously refined until the difference between the current time after start of the slam acceleration and the predicted time of maximum overshoot arrives at a predetermined value (e.g. 500 ms in the example discussed below) at which action is to be taken. A suitable angular position setting which is within safety limits and which reduces the predicted overshoot by the greatest amount can then be selected using the first matrix. If necessary, the selected angular position setting can be interpolated from the values of the first matrix. That is, the setting does not have to be limited to the fixed step values used to generate the first matrix.

Additional optional logic can be used to improve the fidelity and safety of the scheme. This uses on a lookup table, also adaptive in nature, of overshoot amount for the parameter to optimise as a function of initial value of the parameter over the absolute maximum (red-line) value that can be observed in service and time. Using TGT as an example, the initial value of TGT divided by red-line TGT can be used to directly lookup the maximum value and time at which the maximum value will be measured. The maximum value and time from this table can be used to cross-check the value predicted by the linear extrapolation procedure to ensure that action is taken only when both the predicted and looked-up values and times are within a set tolerance. This helps to avoid spurious control of angular position, or control when the prediction is poor.

Figure 9:
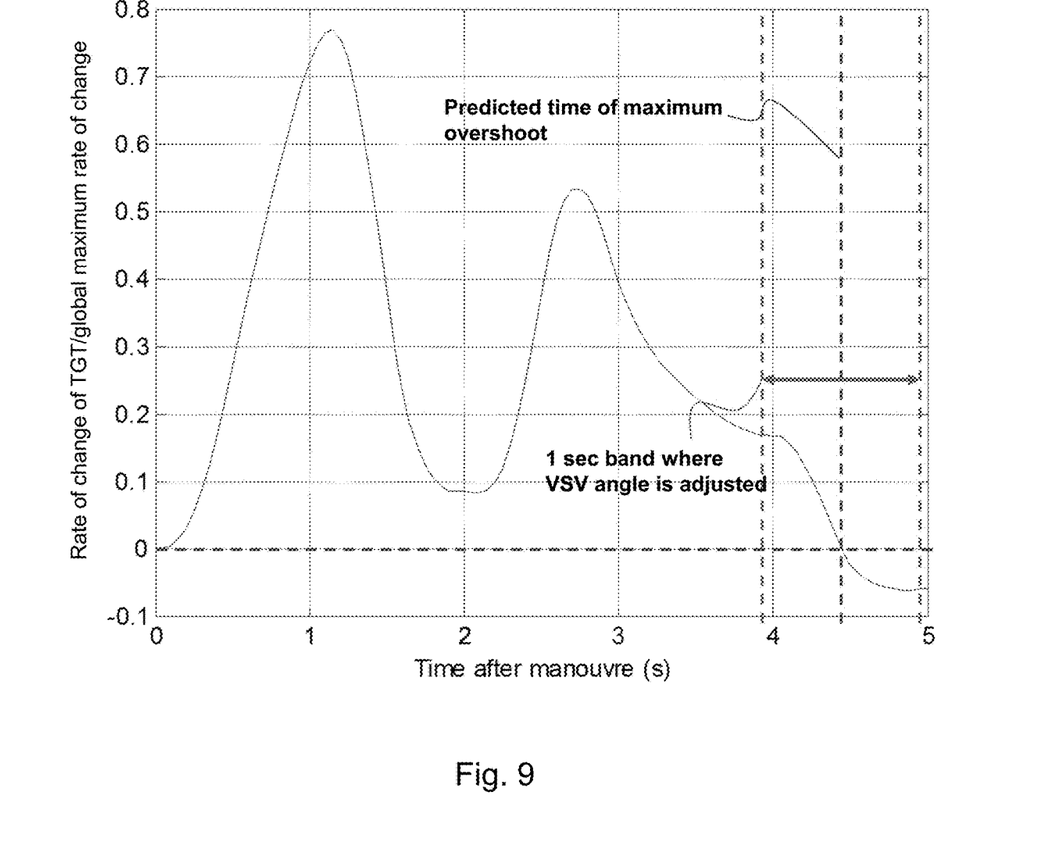
FIG. 9 shows the plot of FIG. 7 superimposed with the timing and duration of application of a selected angular position setting.

Next, the selected angular position setting is applied to the variable-pitch stator vanes for a predetermined period around the predicted time of occurrence. For example, the setting can be applied 500 ms before the expected maximum value of TGT and removed (so that the VSVs return to their nominal scheduled setting) 500 ms after the expected maximum value of TGT, as illustrated in FIG. 9.

Figure 10:
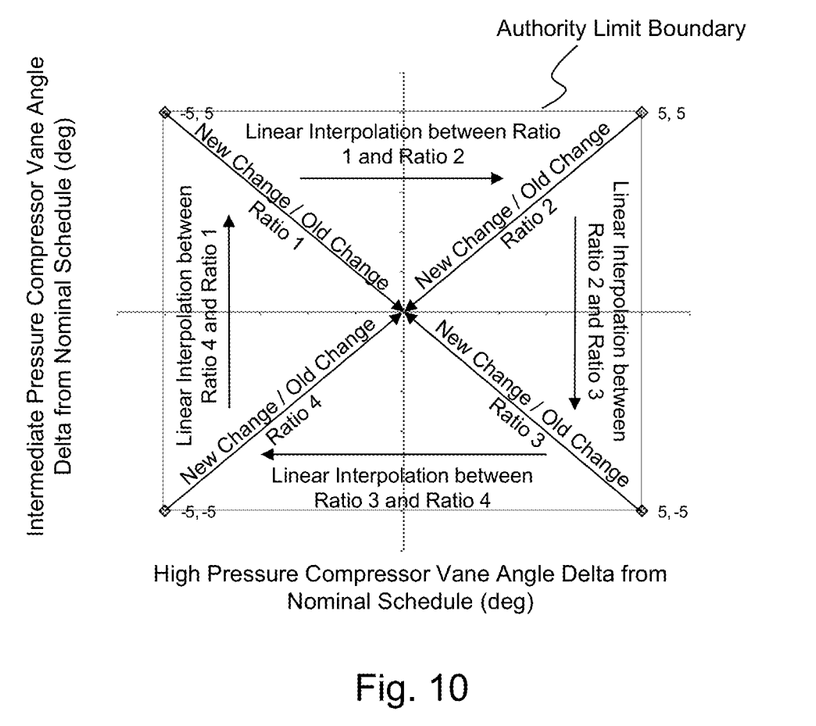
FIG. 10 illustrates a re-calibration approach using the diagram of FIG. 5.

Over time the engine performance changes due to component wear and/or replacement. Accordingly, if the measured reduction in TGT is found to be less than expected by a threshold amount (e.g. 5%), and/or after a predetermined number (e.g. 250) of slam acceleration, the sub-system can perform a recalibration of the first matrix. However, in general it is not necessary to re-measure all the values of the first matrix. Rather, a re-calibration can be performed by re-testing, for example, the "corner points" of the first matrix (i.e. angle settings −5,5; 5,5; 5,−5; −5,−5), as shown in FIG. 10. The four ratios between the corner point values of the maximum TGT and the centre (nominal scheduled setting) maximum TGT value can then be used to linearly interpolate the maximum TGT values from the first matrix to form a re-calibrated first matrix.

In contrast, the second matrix can be continuously updated each time a slam acceleration is performed, values within it being over-written with the latest data to constantly improve its prediction ability.

Due to the limited time frame of the transient overshoots, implementing the scheme described above does not have significant impact on overall engine operational efficiency and engine thrust. However, by avoiding or at least reducing transient overshoots, the scheme has beneficial effects of increasing the lifetime of engine parts (i.e. reducing rates of deterioration) and increasing the time between maintenance shop visits. The scheme is also self-learning and does not rely on any engine model-based prediction. Furthermore, it can re-adjust and re-calibrate as needed using the engine itself rather than requiring a complex engine model. Further the self-learning approach is capable of adapting to hardware changes throughout engine life and can extend life and performance from engines that lie at the extremes of the build scatter band. The scheme is also independent of vane actuation system.

While the invention has been described in conjunction with the exemplary embodiments described above, many equivalent modifications and variations will be apparent to those skilled in the art when given this disclosure. For example, although described above with reference to slam acceleration, the method can also be applied to other types of transient manoeuvre, such as take-off go-around to increase thrust response, and slam decelerations to reduce overshoots and protect against stall and flameout. In addition, instead of TGT, other types of operational parameter, such as high pressure shaft speed, can be controlled by the method. Also, more generally, the method can be applied to control of other components, such as control of the position of a compressed air bleed valve used for active casing control of blade tip clearances. Accordingly, the exemplary embodiments of the invention set forth above are considered to be illustrative and not limiting. Various changes to the described embodiments may be made without departing from the spirit and scope of the invention.

The invention claimed is:

1. A method of controlling settings of one or more actuatable components of a gas turbine engine to reduce or avoid overshoot of an engine operational parameter during a transient engine manoeuvre, the method including:

providing a first matrix which relates reduction in the maximum value of the operational parameter during the transient manoeuvre to settings of the component(s);

providing a second matrix which relates maximum values of the operational parameter attained during the transient manoeuvre to: time to attain the maximum value after initiation of the transient manoeuvre, and rate of change of the operational parameter at the time of the maximum value;

monitoring the engine in operation to identify a start of a transient manoeuvre;

predicting, on the basis of the maximum values of the second matrix, an amount of overshoot of the operational parameter during the identified transient manoeuvre and a time of occurrence of the overshoot;

selecting a setting, using the first matrix, to eliminate the predicted overshoot; and applying the selected setting to the component(s) for a predetermined period around the predicted time of occurrence to reduce or avoid the overshoot.

2. A method according to claim 1, wherein the operational parameter is a working gas temperature of the engine or a shaft speed of the engine.

3. A method according to claim 1 which is a method of controlling angular positions of one or more rows of variable-pitch stator vanes of a gas turbine engine to reduce or avoid overshoot of an engine operational parameter during a transient engine manoeuvre, wherein:

the component(s) are variable pitch stator vanes, the settings of the component(s) are angular position settings of the variable-pitch stator vanes, the setting selected using the first matrix is a selected angular position setting, and the selected angular position setting is applied to the variable-pitch stator vanes for the predetermined period around the predicted time of occurrence.

4. A method according to claim 3, wherein the rows of variable-pitch stator vanes include one or more rows of high pressure compressor variable-pitch stator vanes and/or one or more rows of intermediate pressure compressor variable-pitch stator vanes.

5. A method according to claim 1, wherein the start of the transient manoeuvre is identified by an increase in engine speed demand exceeding a predetermined amount in less than a predetermined time.

6. A method according to claim 1, wherein the amount of the overshoot and the time of occurrence of the overshoot are predicted by linear extrapolation from the values of the second matrix.

7. A method according to claim 1, further including determining the first matrix by applying, for each of a series of initial transient manoeuvres of the engine, a respective predetermined setting to the component(s) and measuring the corresponding reduction in the maximum value of the operational parameter.

8. A method according to claim 7, further including determining the second matrix by measuring, for each of the series of initial transient manoeuvres of the engine, the respective maximum value of the operational parameter, the respective time to attain the maximum value after initiation of the transient manoeuvre, and the respective rate of change of the operational parameter at the time of the maximum value.

9. A method according to claim 1, further including recalibrating the first matrix by applying, for each of a series of subsequent transient manoeuvres of the engine, a respective predetermined setting to the component(s), measuring the corresponding reduction in the maximum value of the operational parameter, and recalibrating the first matrix on the basis of the measured reductions in the maximum value from the series of subsequent transient manoeuvres.

10. A computer program comprising code which, when run on a computer, causes the computer to perform the method of claim 1.

11. A computer readable medium storing the computer program of claim 10.

12. A computer system programmed to perform the method of claim 1.

13. A gas turbine engine having one or more actuatable components and the computer system of claim 12, settings of the one or more components being controllable by the computer system to reduce or avoid overshoot of an engine operational parameter during a transient engine manoeuvre.

* * * * *